US008228530B2

(12) United States Patent
Mimura (10) Patent No.: US 8,228,530 B2
(45) Date of Patent: Jul. 24, 2012

(54) IMAGE FORMING APPARATUS MANAGEMENT SYSTEM

(75) Inventor: Shinichi Mimura, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1161 days.

(21) Appl. No.: 11/681,898

(22) Filed: Mar. 5, 2007

(65) Prior Publication Data

US 2008/0218788 A1    Sep. 11, 2008

(51) Int. Cl.
*G06F 3/12* (2006.01)
*G06K 1/00* (2006.01)

(52) U.S. Cl. ...................... 358/1.15; 358/474

(58) Field of Classification Search ............ 358/1.1, 358/1.9, 1.13, 1.14, 1.15, 474, 448, 400; 726/25

See application file for complete search history.

(56) References Cited

U.S. PATENT DOCUMENTS

| | | | |
|---|---|---|---|
| 7,227,657 B1 * | 6/2007 | Haltmeyer | 358/1.15 |
| 7,417,767 B2 * | 8/2008 | Kato | 358/1.9 |
| 7,877,427 B2 * | 1/2011 | Nakagawa | 707/899 |
| 2004/0252337 A1 * | 12/2004 | Takabayashi et al. | 358/1.15 |
| 2005/0086298 A1 * | 4/2005 | Campbell et al. | 709/203 |
| 2005/0105146 A1 * | 5/2005 | Tanaka | 358/498 |
| 2005/0231759 A1 * | 10/2005 | Kamijima | 358/1.15 |
| 2006/0192999 A1 * | 8/2006 | Kawai | 358/1.15 |
| 2007/0136787 A1 * | 6/2007 | Chen et al. | 726/3 |

FOREIGN PATENT DOCUMENTS

| | | |
|---|---|---|
| JP | 2002-229878 | 8/2002 |
| JP | 2003-308192 | 10/2003 |
| JP | 2004-070817 | 3/2004 |

* cited by examiner

*Primary Examiner* — Gabriel Garcia
(74) *Attorney, Agent, or Firm* — Turocy & Watson, LLP (57) ABSTRACT

An image forming apparatus management system in an example has an information communication terminal that transmits a print request for image data, an image forming apparatus that receives the print request transmitted from the information communication terminal, and a management server having a storage unit for storing a management database in which the information communication terminal and permitted image forming apparatuses for setting image forming apparatuses allowed to print the image data corresponding to the print request transmitted from the information communication terminal are registered in association with each other and a control unit for determining, on the basis of the management database stored by the storage unit, whether printing of the image data transmitted from the information communication terminal by the image forming apparatus should be permitted.

17 Claims, 7 Drawing Sheets

| Group | User name | Assigned MFP | Max use MFP | Current number of use MFP | Current use MFP | Priority MFP |
|---|---|---|---|---|---|---|
| Group A | User A | | | | | |
| | User B | | | | | |
| | User C | | | | | |
| Group B | User D | | | | | |
| | User E | | | | | |

FIG. 5

| Group | User name | Assigned MFP | Max use MFP | Current number of use MFP | Current use MFP | Priority MFP |
|---|---|---|---|---|---|---|
| Group A | User A | 1, 2, 3 | 1 | | | 1, 2, 3 |
| | User B | 2 | 1 | | | 2 |
| | User C | 2, 3 | 2 | | | 3, 2 |
| Group B | User D | 4, 5 | 1 | | | 4, 5 |
| | User E | 4, 5, 6 | 3 | | | 4, 5, 6 |

FIG. 6

| Group | User name | Assigned MFP | Max use MFP | Current number of use MFP | Current use MFP | Priority MFP |
|---|---|---|---|---|---|---|
| Group A | User A | 1, 2, 3 | 1 | 1 | 1 | 1, 2, 3 |
| | User B | 2 | 1 | 1 | 2 | 2 |
| | User C | 2, 3 | 2 | 2 | 3 | 3, 2 |
| Group B | User D | 4, 5 | 1 | 1 | 4 | 4, 5 |
| | User E | 4, 5, 6 | 3 | 1 | 5 | 4, 5, 6 |

IMAGE FORMING APPARATUS MANAGEMENT SYSTEM

BACKGROUND OF THE INVENTION

1. Field of the Invention

The present invention relates to an image forming apparatus management system that manages image forming apparatuses connected by a network.

2. Description of the Related Art

As it is well known, in recent years, there is an image forming apparatus having plural functions such as a copy function, a facsimile function, a scanner function, a printer function, or an image filing function. Such an image forming apparatus is connected to, for example, an arbitrary number of personal computers (hereinafter referred to as PCs) and the outside via a network. Moreover, a plurality of such image forming apparatuses are connected by a network in order to improve convenience for users according to calculation based on an area of an office and the number of PCs.

When plural image forming apparatuses and plural PCs are connected via the network, a specific user can instruct different plural image forming apparatuses to print different print data and plural kinds of work can progress simultaneously. However, when the specific user exclusively uses all the image forming apparatuses, a situation in which other users cannot use the image forming apparatuses on demand occurs, resulting in deterioration in work efficiency as a whole.

Therefore, there is provided an image forming apparatus management system that performs management to allow respective users of plural PCs connected to plural image forming apparatuses via a network to efficiently use the image forming apparatuses.

BRIEF SUMMARY OF THE INVENTION

An image forming apparatus management system of the invention has a first information communication terminal that transmits a print request for image data, a first image forming apparatus that receives the print request transmitted from the first information communication terminal, and a management server having storing means for storing a management database in which the first information communication terminal and permitted image forming apparatuses for setting image forming apparatuses allowed to print the image data corresponding to the print request transmitted from the first information communication terminal are registered in association with each other and controlling means for determining, on the basis of the management database stored by the storing means, whether printing of the image data transmitted from the first information communication terminal by the first image forming apparatus should be permitted.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
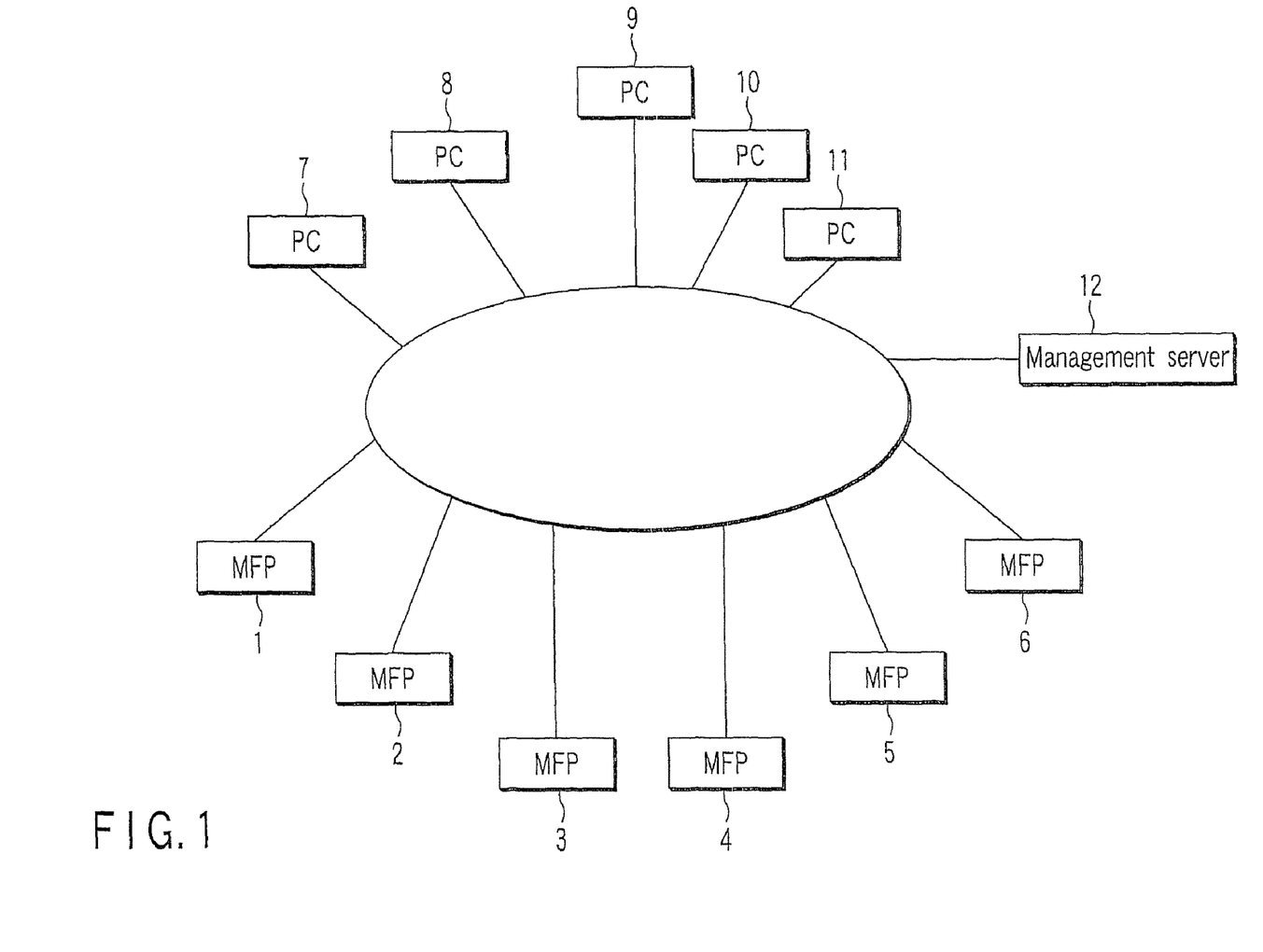
FIG. 1 is a diagram schematically showing a network structure in an embodiment of the invention.

Embodiments of the invention will be explained with reference to the drawings. FIG. 1 is a diagram schematically showing a network structure in which plural image forming apparatuses (hereinafter referred to as MFPs (multi-function peripherals)), plural PCs, and a management server are connected. An MFP 1 is a multi-function printer having a facsimile function, a printer function, a copy function, a scanner function, a network function, and the like. As shown in FIG. 1, MFPs 1 to 6, PCs 7 to 11, and a management server 12 are connected via a network. The network is assumed to be a local area network, although the network may be the Internet. In an explanation of this embodiment, the MFPs are the six MFPs 1 to 6 and the PCs are the five PCs 7 to 11. However, the numbers of the PCs and the MFPs are not limited to this.

Figure 2:
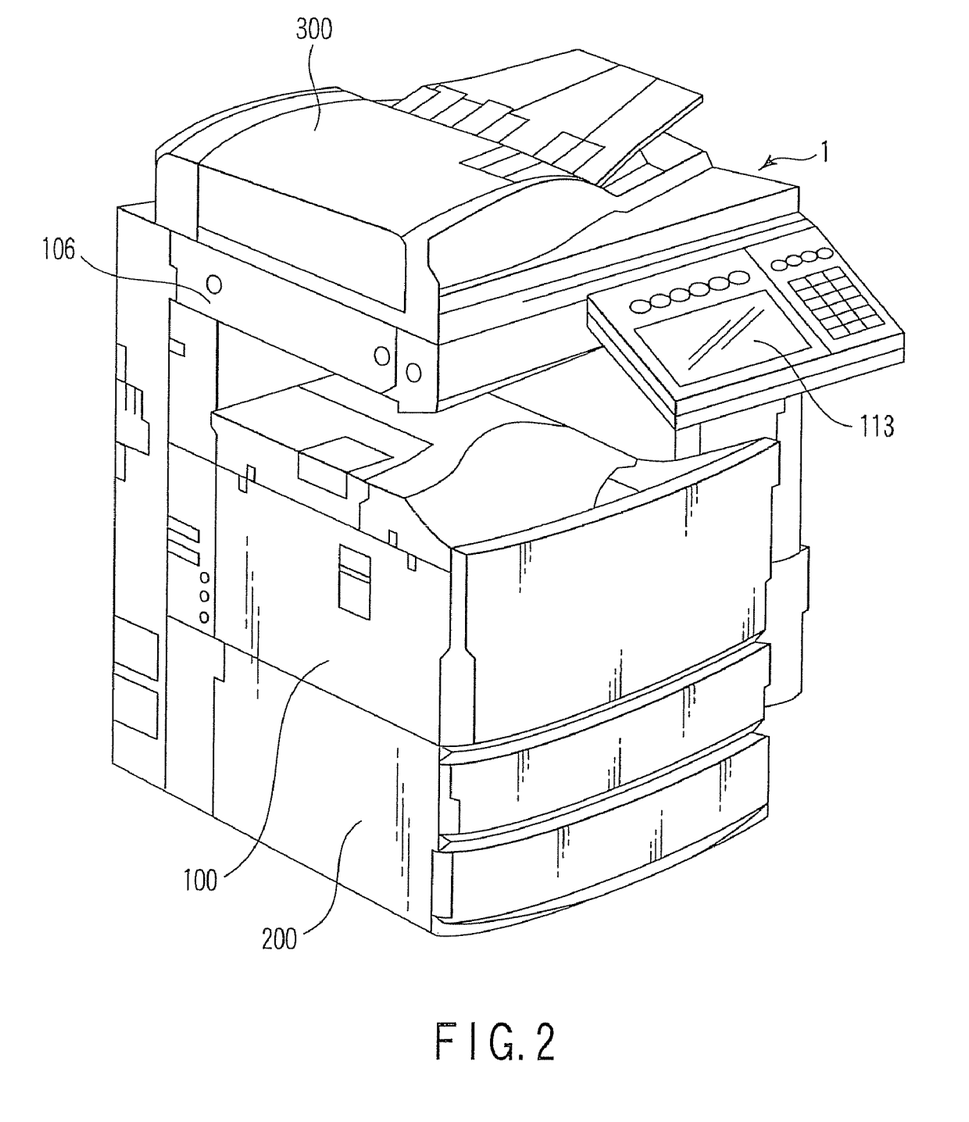
FIG. 2 is a diagram showing an external appearance of an image forming apparatus in the embodiment of the invention.

FIG. 2 shows a main part of an MFP to which the invention is applicable. Since the MFP 1, the MFP 2, the MFP 3, the MFP 4, the MFP 5, and the MFP 6 have the same structure, the structure of the MFP 1 will be explained. The MFP 1 shown in FIG. 2 has an image forming unit main body 100 for outputting image information as an output image called, for example, a hard copy or a print out, a sheet supplying unit 200 capable of supplying a sheet (an output medium) of an arbitrary size, which is used for an image output, to the image forming unit main body 100, and a scanner 106 that captures image information, which is an object subjected to image formation in the image forming unit main body 100, from an object (hereinafter referred to as original), on which image information is held, as image data. An automatic document feeder 300 that discharges, when the original is a sheet-like original, after formation of the image output or the capturing (hereinafter referred to as scanning) of the image information is finished, the original for which the scanning is finished from a scanning position to a discharge position and guides the next original to the scanning position is integrally provided in the scanner 106. An instruction inputting unit, i.e., a control panel (an operation unit) 113 for instructing start of the image formation in the image forming unit main body 100 and start of scanning of the image information of the original by the scanner 106 is provided in a predetermined position of the MFP 1, for example, at an end of a front surface of the scanner 106.

Figure 3:
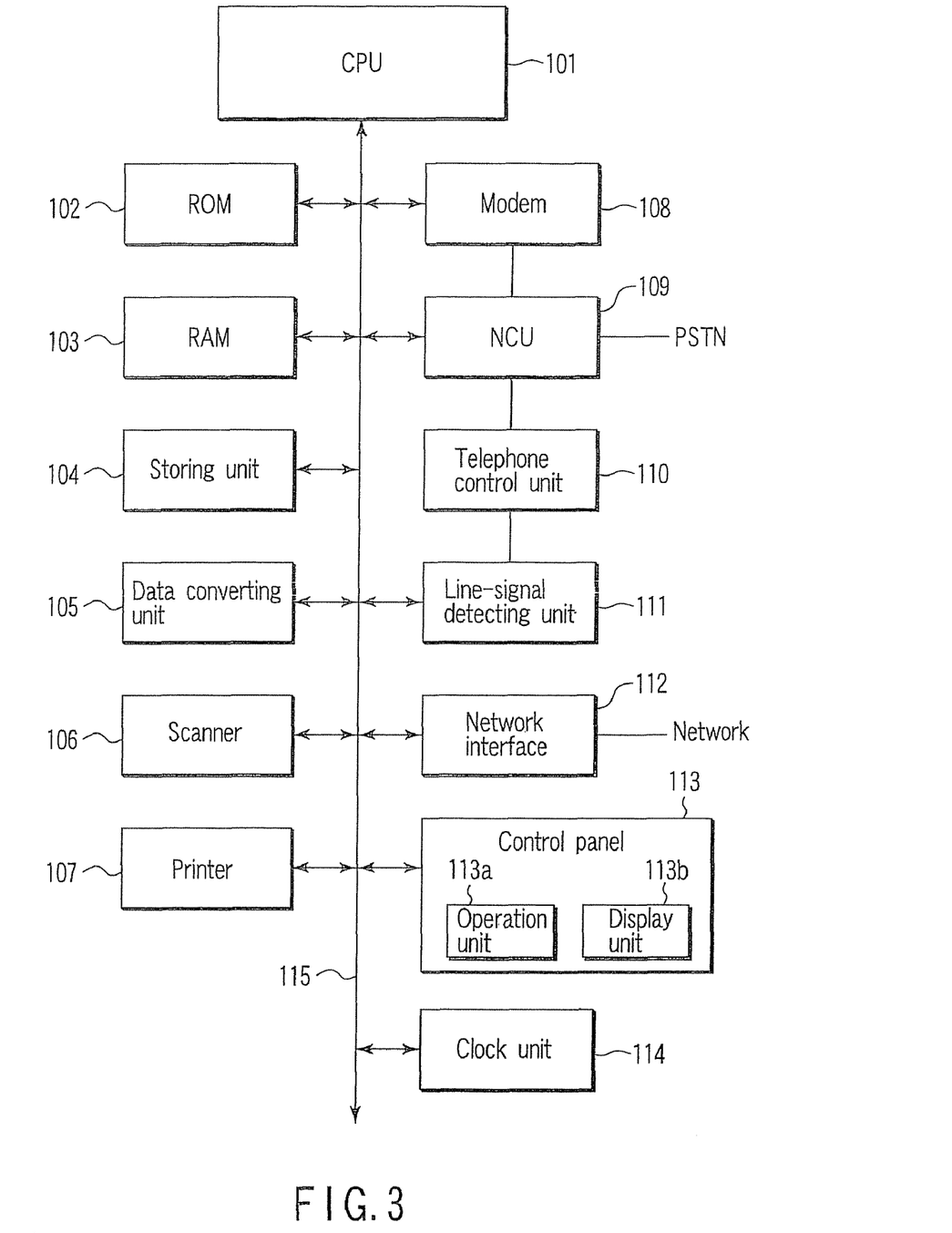
FIG. 3 is a block diagram showing a main part structure of the image forming apparatus in the embodiment of the invention.

FIG. 3 is a block diagram showing a main part structure of the MFP 1. The MFP 1 has a CPU 101, a ROM 102, a RAM 103, a storing unit 104, a data converting unit 105, a scanner 106, a printer 107, a modem 108, an NCU 109, a telephone control unit 110, a line-signal detecting unit 111, a network interface 112, a control panel 113, and a clock unit 114.

The CPU 101, the ROM 102, the RAM 103, the storing unit 104, the data converting unit 105, the scanner 106, the printer 107, the modem 108, the NCU 109, the line-signal detecting unit 111, the network interface 112, the control panel 113, and the clock unit 114 are connected to one another via a bus line 115. The modem 108 and the telephone control unit 110 are connected to the NCU 109. The line-signal detecting unit 111 is connected to the telephone control unit 110.

The CPU 101 performs control processing for collectively controlling the units on the basis of a control program stored in the ROM 102 to realize operations of the MFP 1. The ROM 102 stores the control program and the like for the CPU 101. The RAM 103 is used as a work area and the like for storing various kinds of information required by the CPU 101 to perform various kinds of processing. The storing unit 104 is, for example, a hard disk driving device (HDD). The storing unit 104 temporarily saves image data and stores data concerning various settings such as a setting for a box. The box is created for a predetermined purpose with a name affixed thereto. Details of the box will be described later. The data converting unit 15 applies encoding processing for redundancy compression to image data and performs decoding of image data subjected to encoding for redundancy compression. The scanner 106 performs scanning of a transmission original and generates image data indicating the transmission original. The printer 107 prints an image indicated by the image data on a recording sheet.

The modem 108 modulates image data to generate a facsimile transmission signal and modulates a command given from the CPU 101 to generate a command transmission signal. The modem 108 transmits these transmission signals to a public telephone line (a PSTN subscriber line) via the NCU 109. The modem 108 demodulates a facsimile transmission signal, which arrives via the PSTN subscriber line and is given via the NCU 109, to reproduce image data and demodulates a command transmission signal to reproduce a command. The PSTN subscriber line stored in a PSTN is connected to the NCU 109. The NCU 109 performs, concerning the PSTN subscriber line connected thereto, state monitoring, processing for calling to a network, and the like. The NCU 109 also performs, for example, a setting of a level of a facsimile transmission signal transmitted to the PSTN subscriber line. An external telephone is connected to the telephone control unit 110 as required. The line-signal detecting unit 111 receives a signal, which arrives via the PSTN subscriber line, via the NCU 109 and the telephone control unit 110 and detects arrival of a predetermined signal.

The network interface 112 is used for connection to the network. The network interface 112 receives a print job of print data from, for example, the PC 7 connected thereto via the network. The network interface 112 performs data transmission via the network. The control panel 113 has an operation unit 113a for accepting various instruction inputs to the CPU 101 by a user, a display unit 113b for displaying various kinds of information, which should be reported to the user, under the control by the CPU 101, and the like. The clock unit 114 always performs a timing operation and outputs present time information indicating a present time.

Figure 4:
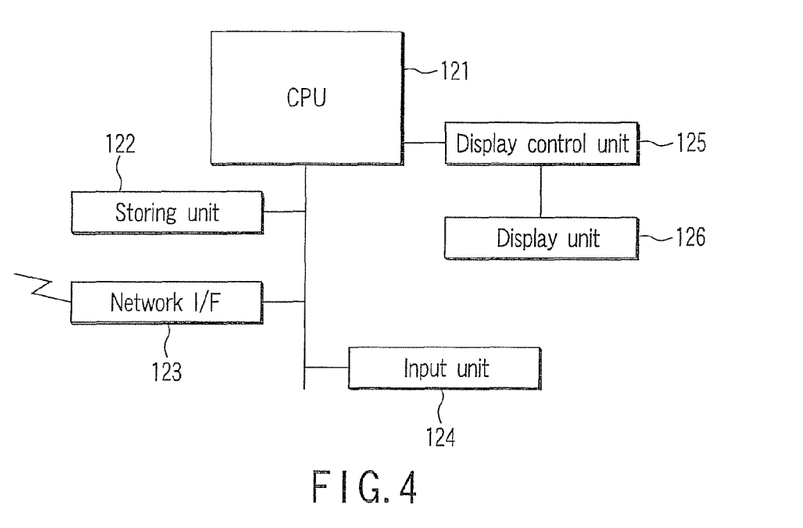
FIG. 4 is a block diagram showing a main part structure of a management server in the embodiment of the invention.

FIG. 4 is a block diagram showing a structure of a control system of a management server to which the invention is applicable. As shown in FIG. 4, the management server 12 has a CPU 121, a storing unit 122, a network interface 123, an input unit 124, a display control unit 125, and a display unit 126. The CPU 121 executes a program stored in the storing unit 122 such as a ROM, an NVM, or a hard disk drive (HDD). The storing unit 122 has stored therein various data such as various setting data, management data, a control program, or control data. The management data is an MFP management database in which a state of use of an image forming apparatus connected by the network is stored. The network interface 123 communicates data through the network. The management server 12 determines, on the basis of the MFP management database, whether a print job of image data from the PC 7 to the image forming apparatus 1 connected via the network interface 123 is permitted to be used. The MFP management database will be described later in detail.

The input unit 124 can input various setting and determine processing. The display control unit 125 controls a screen displayed on the display unit 126. The display control unit 125 reads out the program and the control data stored in the storing unit 122 and displays a screen on the basis of input information inputted with the input unit 124 by a user. The display unit 126 is a display and displays the screen controlled by the display control unit 125.

Figure 5:
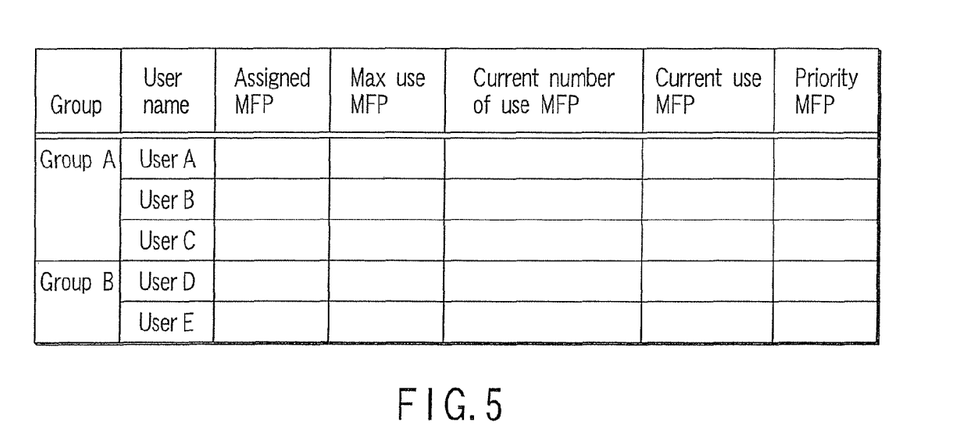
FIG. 5 is a diagram showing a database managed by the management server in the embodiment of the invention.

An MFP management database managed by the management server 12 will be explained using FIG. 5. An administrator of the management server 12 can set the MFP management database by inputting the same with the input unit 124. The MFP management database is stored in the storing unit 122.

In the following explanation, users of the PCs 7, 8, 9, 10, and 11 shown in FIG. 1 are users A, B, C, D, and E, respectively. The MFP management database has "Group" for defining a group name and set for plural groups, "User Name" for setting a user name, "Assigned MFP" for setting an image forming apparatus to be assigned, "Max Use MFP" for setting a maximum number of image forming apparatuses that an identical user can use simultaneously, "Current Number of Use MFP" in which the number of image forming apparatuses in use is inputted on a real time basis, "Current Use MFP" in which an image forming apparatus in use is inputted on a real time basis, and "Priority MFP" for setting an order in which image forming apparatuses should be used.

Figure 6:
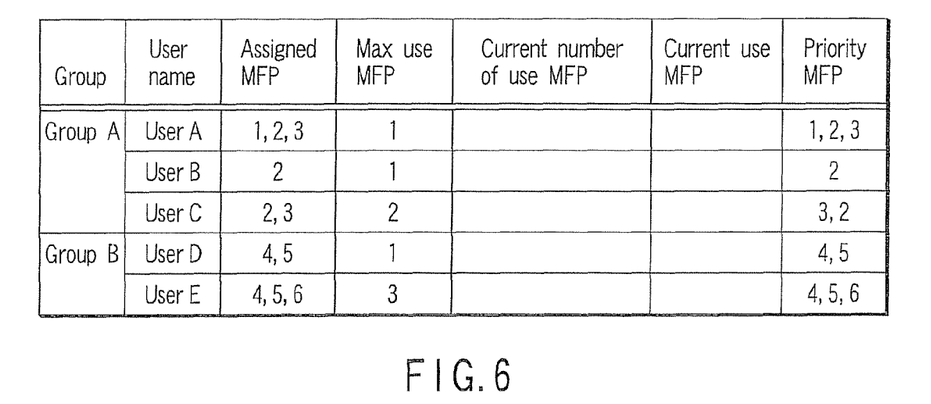
FIG. 6 is a diagram showing the database managed by the management server in the embodiment of the invention.

A specific example of the MFP management database managed by the management server 12 will be explained using FIG. 6. The administrator sets "Group" according to the numbers and arrangements of image forming apparatuses and PCs connected to a network. "Group" is a field for arranging grouped users and image forming apparatuses usable by the grouped users. Two groups, a Group A and a Group B, are set. Image forming apparatuses usable by users set in the Group A and users set in the Group B are divided. It is assumed that the Group A is capable of using image forming apparatuses 1, 2, and 3 and the Group B is capable of using image forming apparatuses 4, 5, and 6.

The administrator sets users assigned to the Group A and the Group B in "User Name". Users A, B, and C are set in the Group A and users D and E are set in the Group B. The administrator sets "Assigned MFP", "Max Use MFP", and "Priority MFP" for the respective users. For example, in the case of the user A in the Group A, the administrator sets "Assigned MFP" as "1, 2, 3". This means that the administrator selects and sets the image forming apparatuses 1, 2, and 3 out of the image forming apparatuses 1, 2, and 3 usable by the Group A. The administrator sets "Max Use MFP" as "1". This means that image forming apparatuses that the user A can use simultaneously are one of the image forming apparatuses 1, 2, and 3. The administrator sets "Priority MFP" as "1, 2, 3". This means that orders of priority of image forming apparatuses usable by the user A are in an order of the image forming apparatus 1, the image forming apparatus 2, and the image forming apparatus 3.

Similarly, the user performs the setting for the users B and C in the Group A and the users D and E in the Group B. In this embodiment, the setting is performed as follows as shown in FIG. 5. "Assigned MFP", "Max Use MFP", and "Priority MFP" of the user A are set as "1, 2, 3", "1", and "1, 2, 3", respectively. "Assigned MFP", "Max Use MFP", and "Priority MFP" of the user B are set as "2", "1", and "2", respectively. "Assigned MFP", "Max Use MFP", and "Priority MFP" of the user C are set as "2, 3", "2", and "3, 2", respectively. "Assigned MFP", "Max Use MFP", and "Priority MFP" of the user D are set as "4, 5", "1", and "4, 5", respectively. "Assigned MFP", "Max Use MFP", and "Priority MFP" of the user A are set as "4, 5, 6", "3", and "4, 5, 6", respectively.

Figure 7:
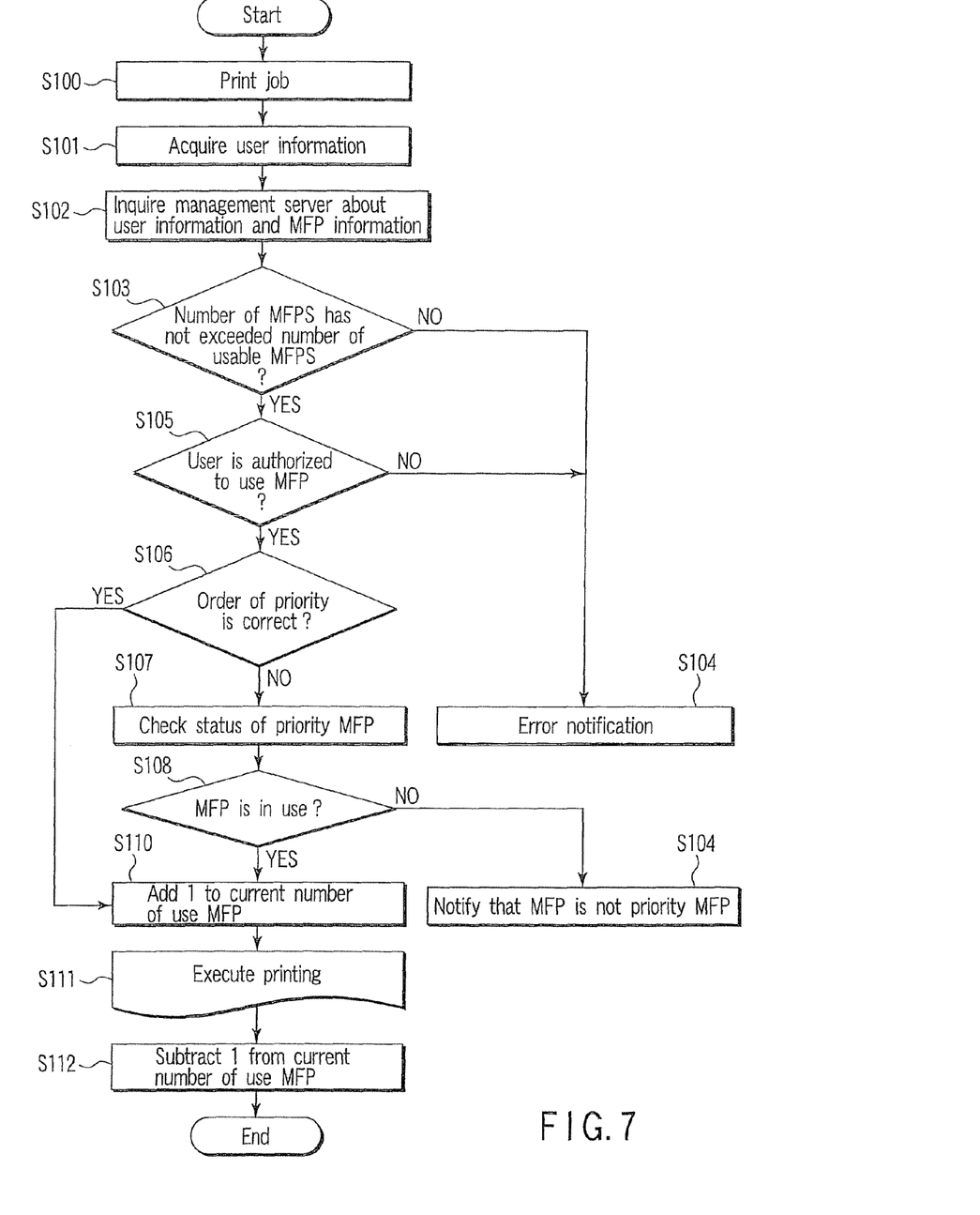
FIG. 7 is a flowchart showing processing by the management server in the embodiment of the invention.

Processing by the management server 12 at the time when a print job is requested from any one of the users will be explained using a flowchart in FIG. 7. For example, the PC 7 (the user A corresponding to the PC 7) transmits a print job for print data via the network designating that the print data should be printed in the image forming apparatus 1 (step S100). The CPU 11 of the image forming apparatus 1 acquires, from the print job received, user information indicating from which PC (or user) the print job is transmitted (step S101). The image forming apparatus 1 accesses the management server 12 and transmits the user information and MFP information indicating that the image forming apparatus 1 is accessing the management server 12 (step S102). When the CPU 121 of the management server 12 receives the user information (information indicating the print job from the user A) and the MFP information (information indicating the print job requested to the image forming apparatus 1), the CPU 121 reads out the MFP management database stored in the storing unit 122. The CPU 121 of the management server 12 determines, on the basis of the fields of "Max Use MFP", "Current Number of Use MFP", and "Current Use MFP" of the user A, whether the number of image forming apparatuses in use has not exceeded the number of usable image forming apparatuses (step S103). For example, when the user A simultaneously transmits the print job of the print data to the image forming apparatus 1 and the image forming apparatus 2, if "Max Use MFP" is "1", the CPU 121 of the management server 12 determines that the number of image forming apparatuses in use has exceeded the number of usable image forming apparatuses. Even when the user A transmits the print job of the print data to only the image forming apparatus 1, for example, if "Max Use MFP" is "1" and "Current Use MFP" is already "2", the CPU 121 of the management server 12 determines that the number of image forming apparatuses in use has exceeded the number of usable image forming apparatuses. When the CPU 121 of the management server 12 determines that the number of image forming apparatuses in use has exceeded the number of usable image forming apparatuses (step S103, NO), the CPU 121 of the management server 12 transmits error notification indicating that the print data cannot be printed in the image forming apparatus 1 to the PC 7 in a state of a print queue on the PC 7 side (step S104). When the CPU 121 of the management server 12 determines that the number of image forming apparatuses in use has not exceeded the number of usable image forming apparatuses (step S103, YES), the CPU 121 of the management server 12 determines, on the basis of the field of "Assigned MFP" of the user A, whether the image forming apparatus 1 to which the user A has transmitted the print job is an image forming apparatus that the user A is authorized to use (step S105). When the CPU 121 of the management server 12 determines that the user A is not authorized to use the image forming apparatus 1 (step S105, NO), the CPU 121 of the management server 12 transmits error notification indicating that the print data cannot be printed in the image forming apparatus 1 to the PC 7 in the state of a print queue on the PC 7 side (step S104). When the CPU 121 of the management server 12 determines that the user A is authorized to use the image forming apparatus 1 (step S105, YES), concerning the image forming apparatus 1 to which the user A has transmitted the print job, the CPU 121 of the management server 12 determines, on the basis of the field of "Priority MFP" of the user A, whether an order of priority among the image forming apparatuses assigned to the user A is correct (step S106).

For example, when the field of "Priority MFP" of the user A is "1", since an image forming apparatus having a first order of priority is the image forming apparatus 1, the CPU 121 of the management server 12 determines that the order of priority is correct. For example, when the field of "Priority MFP" of the user A is "1, 2", since an image forming apparatus having a first order of priority is the image forming apparatus 1, the CPU 121 of the management server 12 determines that the order of priority is correct. For example, when the field of "Priority MFP" of the user A is "3, 2, 1", since an image forming apparatus having a first order of priority is the image forming apparatus 3 and an image forming apparatus having a second order of priority is the image forming apparatus 2, the CPU 121 of the management server 12 determines that the order of priority is not correct.

When the CPU 121 of the management server 12 determines that the order of priority is not correct (step S106, NO), the CPU 121 of the management server 12 checks a status (a state of use) of an image forming apparatus having an order of priority in the field of "Priority MFP" of the user A higher than that of the image forming apparatus 1 to which the user A has transmitted the print job (step S107).

The CPU 121 of the management server 12 determines whether numbers of image forming apparatuses having orders of priority higher than that of the image forming apparatus 1 in the field of "Priority MFP" of the user A are inputted in the fields of "Current Use MFP" of all the users set in the MFP management database. In other words, the CPU 121 of the management server 12 determines whether an image forming apparatus having an order of priority higher than that of the image forming apparatus 1 in the field of "Priority MFP" of the user A is in use (step S108).

For example, when the field of "Priority MFP" of the user A is "3, 2, 1", the CPU 121 of the management server 12 determines whether "3" or "2" is inputted in the fields of "Current Use MFP" of all the users set in the MFP management database.

When the CPU 121 of the management server 12 determines that an image forming apparatus having an order of priority higher than that of the image forming apparatus 1 in the field of "Priority MFP" of the user A is not in use (step S108, NO), the CPU 121 of the management server 12 transmits notification indicating that the print job has been sent to an image forming apparatus having an inappropriate order of priority to the PC 7 in the state of a print queue on the PC 7 side (step S109). This means that it is possible to use an image forming apparatus having an order of priority higher than that of the image forming apparatus 1 to which the user A has transmitted the print job. It is possible to notify information indicating that the use of the image forming apparatus 1 to which the user A has transmitted the print job is changed to the use of the image forming apparatus having an order of priority higher than that of the image forming apparatus 1 simultaneously with the notification indicating that the print job has been transmitted to the image forming apparatus having an inappropriate order of priority. In this case, when there are plural image forming apparatuses usable by the user A, the CPU 121 of the management server 12 notifies that it is possible to use an image forming apparatus having a highest order of priority set in "Priority MFP" of the user A.

When the CPU 121 of the management server 12 determines that an image forming apparatus having an order of priority higher than that of the image forming apparatus 1 in the field of "Priority MFP" of the user A is in use (step S108, YES), the CPU 121 of the management server 12 adds 1 to a number inputted in the field of "Current Number of Use MFP" of the user A in the MFP management database (step S110). The CPU 121 of the management server 12 inputs "1" indicating the use of the image forming apparatus 1 in the field of "Current Use MFP" of the user A in the MFP management database. When another user is using the image forming apparatus 1, the user A stays in a waiting state until the use of the image forming apparatus 1 by the another user is finished. Therefore, the CPU 121 of the management server 12 does not input "1" indicating the use of the image forming apparatus 1 in the field of "Current Use MFP" of the user A in the MFP management database until the user A becomes capable of using the image forming apparatus 1.

When the CPU 121 of the management server 12 determines that the order of priority is correct (step S106, YES), the CPU 121 of the management server 12 adds 1 to a number inputted in the field of "Current Number of Use MFP" of the user A in the MFP management database (step S110). The CPU 121 of the management server 12 inputs "1" indicating the use of the image forming apparatus 1 in the field of "Current Use MFP" of the user A in the MFP management database. When another user is using the image forming apparatus 1, the user A stays in a waiting state until the use of the image forming apparatus 1 by the another user is finished. Therefore, the CPU 121 of the management server 12 does not input "1" indicating the use of the image forming apparatus 1 in the field of "Current Use MFP" of the user A in the MFP management database until the user A becomes capable of using the image forming apparatus 1. The image forming apparatus 1 prints print data corresponding to the print job requested by the user A with the printer 107 (S111). After printing the print data with the printer 107, the image forming apparatus 1 notifies the management server 12 of print finish information indicating that printing of the print data corresponding to the print job requested by the user A is finished in the image forming apparatus 1. When the management server 12 receives the print finish information, the management server 12 subtracts 1 from a number inputted in the field of "Current Number of Use MFP" of the user A in the MFP management database (S112).

In the above explanation, the image forming apparatus 1 accesses the management server 12 and checks whether printing of print data corresponding to the print job is permitted. The print job (including information designating in which image forming apparatus the print job is printed) requested by the user A may be directly transmitted to the management server 12. When the management server 12 determines that print data corresponding to the print job may be printed, the print data corresponding to the print job may be transferred to the image forming apparatus in which the print job is designated to be printed.

Figure 8:
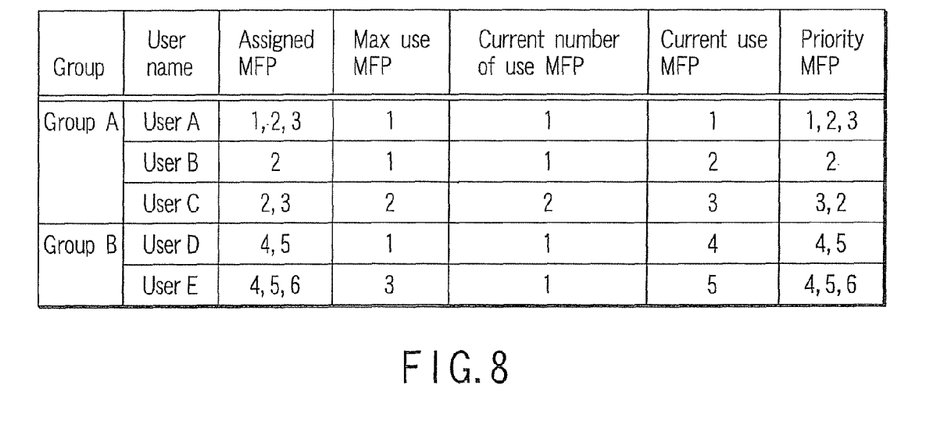
FIG. 8 is a diagram showing the database managed by the management server in the embodiment of the invention.

The flow explained with reference to FIG. 7 will be explained using specific examples of the MFP management database shown in FIGS. 6 and 8. In the Group A, the users A, B, and C are set as users. An example in which the users A, B, and C transmit print jobs in this order will be explained. The user A transmits a print job to the image forming apparatus 1 in a state of the MFP management database in FIG. 6. Since "Max Use MFP" is "1" and "Current Number of Use MFP" of the user A is "0", the number of image forming apparatus in use has not exceeded the number of usable image forming apparatuses (step S103, YES). "Assigned MFP" of the user A is "1, 2, 3" and the user A is authorized to use the image forming apparatus 1 (step S105, YES). "Priority MFP" is "1, 2, 3" and an order of priority of the image forming apparatus 1 selected by the user A is correct (step S106, YES). Therefore, as shown in FIG. 8, the CPU 121 of the management server 12 adds 1 to a number inputted in the field of "Current Number of Use MFP" of the user A in the MFP management database (step S110). Since no user is using the image forming apparatus 1, the CPU 121 of the management server 12 inputs "1" indicating the use of the image forming apparatus 1 in the field of "Current Use MFP" of the user A in the MFP management database. The image forming apparatus 1 subjects the print data transmitted by the user A to print processing (step S111).

Subsequently, the user B transmits a print job to the image forming apparatus 2. Since "Max Use MFP" is "1" and "Current Number of Use MFP" of the user B is still "0", the number of image forming apparatuses in use has not exceeded the number of usable image forming apparatuses (step S103, YES). "Assigned MFP" of the user B is "2" and the user B is authorized to use the image forming apparatus 2 (step S105, YES). "Priority MFP" is "2" and an order of priority of the image forming apparatus 2 selected by the user B is correct (step S106, YES). Therefore, as shown in FIG. 8, the CPU 121 of the management server 12 adds 1 to a number inputted in the field of "Current Number of Use MFP" of the user B in the MFP management database (step S110). Since no user is using the image forming apparatus 2, the CPU 121 of the management server 12 inputs "2" indicating the use of the image forming apparatus 2 in the field of "Current Use MFP" of the user A in the MFP management database. The image forming apparatus 2 subjects the print data transmitted by the user B to print processing (step S11).

An example in which the user C transmits a print job to the image forming apparatus 3 and then transmits another print job to the image forming apparatus 2 will be explained. First, the user C transmits a print job to the image forming apparatus 3. Since "Max Use MFP" is "2" and "Current Number of Use MFP" of the user C is "0", the number of image forming apparatuses in use has not exceeded the number of usable image forming apparatuses (step S103, YES). "Assigned MFP" of the user C is "2, 3" and the user C is authorized to use the image forming apparatus 3 (step S105, YES). "Priority MFP" is "3, 2" and an order of priority of the image forming apparatus 3 selected by the user C is correct (step S106, YES). Therefore, as shown in FIG. 8, the CPU 121 of the management server 12 adds 1 to a number inputted in the field of "Current Number of Use MFP" of the user C in the MFP management database (step S110). Since no user is using the image forming apparatus 3, the CPU 121 of the management server 12 inputs "3" indicating the use of the image forming apparatus 3 in the field of "Current Use MFP" of the user A in the MFP management database. The image forming apparatus 3 subjects the print data transmitted by the user C to print processing (step S111).

Since the user C is using the image forming apparatus 3, the user C transmits a new print job to another usable image forming apparatus 2. Since "Max Use MFP" is "2" and "Current Number of Use MFP" of the user C is "1", the number of image forming apparatuses in use has not exceeded the number of usable image forming apparatuses (step S103, YES). "Assigned MFP" of the user C is "2, 3" and the user C is authorized to use the image forming apparatus 2 (step S105, YES). "Priority MFP" is "3, 2" and an order of priority of the image forming apparatus 2 selected by the user C is not correct (step S106, NO). The image forming apparatus 3 having an order of priority higher than that of the image forming apparatus 2 in the field of "Priority MFP" of the user C is in use (step S108, YES). Therefore, as shown in FIG. 8, the CPU 121 of the management server 12 adds 1 to a number inputted in the field of "Current Number of Use MFP" of the user C in the MFP management database to increase the number to "2" (step S110). Since the user B is using the image forming apparatus 2, the user C stays in a waiting state until the use of the image forming apparatus 2 by the user B is finished. Therefore, the CPU 121 of the management server 12 does not input "2" indicating the use of the image forming apparatus 2 in the field of "Current Use MFP" of the user C in the MFP management database until the user C becomes capable of using the image forming apparatus 2. Therefore, "3" indicating that only the image forming apparatus 3 is in use remains inputted in the field of "Current Use MFP".

The users D and E are set in the Group B as users. An example in which the users D and E transmit print jobs in this order will be explained. The user D transmits a print job to the image forming apparatus 4 in a state of the MFP management database in FIG. 6. Since "Max Use MFP" is "1" and "Current Number of Use MFP" of the user A is still "0", the number of image forming apparatuses in use has not exceeded the number of usable image forming apparatuses (step S103, YES). "Assigned MFP" of the user D is "4, 5" and the user C is authorized to use the image forming apparatus 4 (step S105, YES). "Priority MFP" is "4, 5" and an order of priority of the image forming apparatus 4 selected by the user D is correct (step S106, YES). Therefore, as shown in FIG. 8, the CPU 121 of the management server 12 adds 1 to a number inputted in the field of "Current Number of Use MFP" of the user A in the MFP management database (step S110). Since the image forming apparatus 4 is not in use, the CPU 121 of the management server 12 inputs "4" indicating the use of the image forming apparatus 4 in the field of "Current Use MFP" of the user A in the MFP management database. The image forming apparatus 4 subjects the print data transmitted by the user D to print processing (step S111).

Subsequently, the user E transmits a print job to the image forming apparatus 5. Since "Max Use MFP" is "3" and "Current Number of Use MFP" of the user E is "0", the number of image forming apparatuses in use has not exceeded the number of usable image forming apparatuses (step S103, YES). "Assigned MFP" of the user B is "4, 5, 6" and the user B is authorized to use the image forming apparatus 5 (step S105, YES). "Priority MFP" is "4, 5, 6" and an order of priority of the image forming apparatus 5 selected by the user E is not correct (step S106, NO). The image forming apparatus 4 having an order of priority higher than that of the image forming apparatus 5 in the field of "Priority MFP" of the user E is in use (step S108, YES). Therefore, as shown in FIG. 8, the CPU 121 of the management server 12 adds 1 to a number inputted in the field of "Current Number of Use MFP" of the user D in the MFP management database to increase the number to "1" (step S110). Since the image forming apparatus 5 is not in use, the CPU 121 of the management server 12 inputs "5" indicating the use of the image forming apparatus 5 in the field of "Current Use MFP" of the user E in the MFP management database. The image forming apparatus 5 subjects the print data transmitted by the user E to print processing (step S111).

Figure 9:
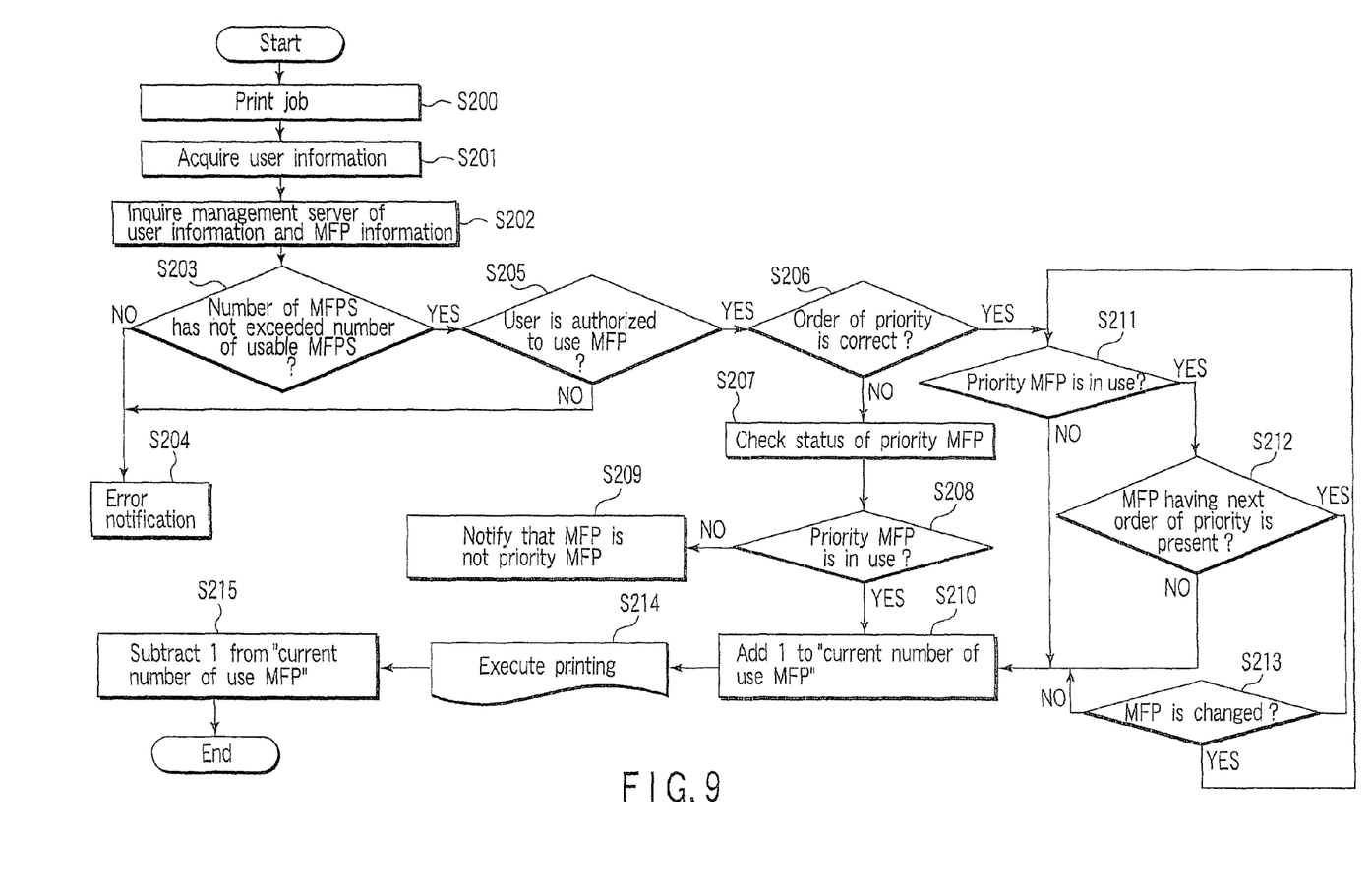
FIG. 9 is a flowchart showing processing by a management server in a second embodiment of the invention.

As another embodiment, processing by the management server 12 at the time when a print job is requested from any one of users will be explained using a flowchart in FIG. 9. For example, the PC 7 (the user A corresponding to the PC 7) transmits a print job of print data via the network designating that the print job is printed in the image forming apparatus 1 (step S200). The CPU 11 of the image forming apparatus 1 acquires, from the print job received, user information indicating from which PC (or user) the print job is transmitted (step S201). The image forming apparatus 1 accesses the management server 12 and transmits the user information and MFP information indicating that the image forming apparatus 1 is accessing the management server 12 (step S202). When the CPU 121 of the management server 12 receives the user information (information indicating the print job from the user A) and the MFP information (information indicating the print job requested to the image forming apparatus 1), the CPU 121 reads out the MFP management database stored in the storing unit 122. The CPU 121 of the management server 12 determines, on the basis of the fields of "Max Use MFP", "Current Number of Use MFP", and "Current Use MFP" of the user A, whether the number of image forming apparatuses in use has not exceeded the number of usable image forming apparatuses (step S203). For example, when the user A simultaneously transmits the print job of the print data to the image forming apparatus 1 and the image forming apparatus 2, if "Max Use MFP" is "1", the CPU 121 of the management server 12 determines that the number of image forming apparatuses in use has exceeded the number of usable image forming apparatuses. Even when the user A transmits the print job of the print data to only the image forming apparatus 1, for example, if "Max Use MFP" is "1" and "Current Use MFP" is already "2", the CPU 121 of the management server 12 determines that the number of image forming apparatuses in use has exceeded the number of usable image forming apparatuses. When the CPU 121 of the management server 12 determines that the number of image forming apparatuses in use has exceeded the number of usable image forming apparatuses (step S203, NO), the CPU 121 of the management server 12 transmits error notification indicating that the print data cannot be printed in the image forming apparatus 1 to the PC 7 in a state of a print queue on the PC 7 side (step S204). When the CPU 121 of the management server 12 determines that the number of image forming apparatuses in use has not exceeded the number of usable image forming apparatuses (step S203, YES), the CPU 121 of the management server 12 determines, on the basis of the field of "Assigned MFP" of the user A, whether the image forming apparatus 1 to which the user A has transmitted the print job is an image forming apparatus that the user A is authorized to use (step S205). When the CPU 121 of the management server 12 determines that the user A is not authorized to use the image forming apparatus 1 (step S205, NO), the CPU 121 of the management server 12 transmits error notification indicating that the print data cannot be printed in the image forming apparatus 1 to the PC 7 in the state of a print queue on the PC 7 side (step S204). When the CPU 121 of the management server 12 determines that the user A is authorized to use the image forming apparatus 1 (step S205, YES), concerning the image forming apparatus 1 to which the user A has transmitted the print job, the CPU 121 of the management server 12 determines, on the basis of the field of "Priority MFP" of the user A, whether an order of priority among the image forming apparatuses assigned to the user A is correct (step S206).

For example, when the field of "Priority MFP" of the user A is "1", since an image forming apparatus having a first order of priority is the image forming apparatus 1, the CPU 121 of the management server 12 determines that the order of priority is correct. For example, when the field of "Priority MFP" of the user A is "1, 2", since an image forming apparatus having a first order of priority is the image forming apparatus 1, the CPU 121 of the management server 12 determines that the order of priority is correct. For example, when the field of "Priority MFP" of the user A is "3, 2, 1", since an image forming apparatus having a first order of priority is the image forming apparatus 3 and an image forming apparatus having a second order of priority is the image forming apparatus 2, the CPU 121 of the management server 12 determines that the order of priority is not correct.

When the CPU 121 of the management server 12 determines that the order of priority is not correct (step S106, NO), the CPU 121 of the management server 12 checks a status (a state of use) of an image forming apparatus having an order of priority in the field of "Priority MFP" of the user A higher than that of the image forming apparatus 1 to which the user A has transmitted the print job (step S207).

The CPU 121 of the management server 12 determines whether numbers of image forming apparatuses having orders of priority higher than that of the image forming apparatus 1 in the field of "Priority MFP" of the user A are inputted in the fields of "Current Use MFP" of all the users set in the MFP management database. In other words, the CPU 121 of the management server 12 determines whether an image forming apparatus having an order of priority higher than that of the image forming apparatus 1 in the field of "Priority MFP" of the user A is in use (step S208).

For example, when the field of "Priority MFP" of the user A is "3, 2, 1", the CPU 121 of the management server 12 determines whether "3" or "2" is inputted in the fields of "Current Use MFP" of all the users set in the MFP management database.

When the CPU 121 of the management server 12 determines that an image forming apparatus having an order of priority higher than that of the image forming apparatus 1 in the field of "Priority MFP" of the user A is not in use (step S208, NO), the CPU 121 of the management server 12 transmits notification indicating that the print job has been sent to an image forming apparatus having an inappropriate order of priority to the PC 7 in the state of a print queue on the PC 7 side (step S209). This means that it is possible to use an image forming apparatus having an order of priority higher than that of the image forming apparatus 1 to which the user A has transmitted the print job. It is possible to notify information indicating that the use of the image forming apparatus 1 to which the user A has transmitted the print job is changed to the use of the image forming apparatus having an order of priority higher than that of the image forming apparatus 1 simultaneously with the notification indicating that the print job has been transmitted to the image forming apparatus having an inappropriate order of priority. In this case, when there are plural image forming apparatuses usable by the user A, the CPU 121 of the management server 12 notifies that it is possible to use an image forming apparatus having a highest order of priority set in "Priority MFP" of the user A.

When the CPU 121 of the management server 12 determines that an image forming apparatus having an order of priority higher than that of the image forming apparatus 1 in the field of "Priority MFP" of the user A is in use (step S208, YES), the CPU 121 of the management server 12 adds 1 to a number inputted in the field of "Current Number of Use MFP" of the user A in the MFP management database (step S210). The CPU 121 of the management server 12 inputs "1" indicating the use of the image forming apparatus 1 in the field of "Current Use MFP" of the user A in the MFP management database. When another user is using the image forming apparatus 1, the user A stays in a waiting state until the use of the image forming apparatus 1 by the another user is finished. Therefore, the CPU 121 of the management server 12 does not input "1" indicating the use of the image forming apparatus 1 in the field of "Current Use MFP" of the user A in the MFP management database until the user A becomes capable of using the image forming apparatus 1.

When the CPU 121 of the management server 12 determines that the order of priority is correct (step S206, YES), the CPU 121 of the management server 12 determines whether a number "1" indicating the use of the image forming apparatus 1 in the field of "Priority MFP" of the user A is inputted in the fields of "Current Use MFP" of all the users set in the MFP management database. In other words, the CPU 121 of the management server 12 determines whether another user is using the image forming apparatus 1 selected by the user A (step S211). When the CPU 121 of the management server 12 determines that another user is not using the image forming apparatus 1 selected by the user A (step S211, NO), the CPU 121 of the management server 12 adds 1 to a number inputted in the field of "Current Number of Use MFP" of the user A in the MFP management database (step S210). The CPU 121 of the management server 12 inputs "1" indicating the use of the image forming apparatus 1 in the field of "Current Use MFP" of the user A in the MFP management database. When the CPU 121 of the management server 12 determines that another user is using the image forming apparatus 1 selected by the user A (step S211, YES), the CPU 121 of the management server 12 determines whether an image forming apparatus having an order of priority next to that of the image forming apparatus 1 is set in the field of "Priority MFP" of the user A (step S212). For example, when the field of "Priority MFP" of the user A is "1", an image forming apparatus having an order of priority next to that of the image forming apparatus 1 is not set. For example, when the field of "Priority MFP" of the user A is "1, 2, 3", an image forming apparatus having an order of priority next to that of the image forming apparatus 1 is the image forming apparatus 2. When the CPU 121 of the management server 12 determines that an image forming apparatus having an order of priority next to that of the image forming apparatus 1 is not set in the field of "Priority MFP" of the user A (step S212, NO), the CPU 121 of the management server 12 adds 1 to a number inputted in the field "Current Number of Use MFP" of the user A in the MFP management database (step S210). Since the another user is using the image forming apparatus 1, the user A stays in a waiting state until the use of the image forming apparatus 1 by the another user is finished. Therefore, the CPU 121 of the management server 12 does not input "1" indicating the use of the image forming apparatus 1 in the field of "Current Use MFP" of the user A in the MFP management database until the user A becomes capable of using the image forming apparatus 1.

When the CPU 121 of the management server 12 determines that an image forming apparatus having an order of priority next to that of the image forming apparatus 1 is set in the field "Priority MFP" of the user A (step S212, YES), the CPU 121 of the management server 12 transmits information for urging the PC 7 (the user A corresponding to the PC 7) to set whether the image forming apparatus 1 is changed to perform printing in the image forming apparatus having an order of priority next to that of the image forming apparatus 1 (S213). When the user A sets that the image forming apparatus 1 is not changed to perform printing in the image forming apparatus having an order of priority next to that of the image forming apparatus 1 and transmits setting information to the management server (step S213, NO), the CPU 121 of the management server 12 adds 1 to a number inputted in the field of "Current Number of Use MFP" of the user A in the MFP management database (step S210). Since the another user is using the image forming apparatus 1, the user A stays in a waiting state until the use of the image forming apparatus 1 by the another user is finished. Therefore, the CPU 121 of the management server 12 does not input "1" indicating the use of the image forming apparatus 1 in the field of "Current Use MFP" of the user A in the MFP management database until the user A becomes capable of using the image forming apparatus 1.

When the user A sets that the image forming apparatus 1 is changed to perform printing in the image forming apparatus having an order of priority next to that of the image forming apparatus 1 and transmits setting information to the management server (step S213, YES), the CPU 121 of the management server 12 determines whether another user is using the image forming apparatus having an order of priority next to that of the image forming apparatus 1 selected by the user A anew (step S211).

When the CPU 121 of the management server 12 adds 1 to the field of "Current Number of Use MFP" in step S210, the CPU 121 of the management server 12 notifies the image forming apparatus 1 that printing of print data corresponding to the print job requested by the user A is permitted. The image forming apparatus 1 prints the print data corresponding to the print job requested by the user A with the printer 107 (S214). After printing the print data with the printer 107, the image forming apparatus 1 notifies the management server 12 of print finish information indicating that the printing of the print data corresponding to the print job requested by the user A is finished in the image forming apparatus 1. When the management server 12 receives the print finish information, the management server 12 subtracts 1 from a number inputted in the field of "Current Number of Use MFP" of the user A in the MFP management database (S215).

In the above explanation, the print job requested by the user A is transmitted to the image forming apparatus 1 requested to perform printing. The image forming apparatus 1 accesses the management server 12 and checks whether printing of print data corresponding to the print job is permitted. The print job (including information designating in which image forming apparatus printing is performed) requested by the user A may be directly transmitted to the management server 12. When the management server 12 determines that the print data corresponding to the print job may be printed, the print data corresponding to the print job may be transferred to the image forming apparatus in which the print data is designated to be performed.

As explained above, it is possible to improve efficiency of use of the image forming apparatuses of all the users by providing MFPs that a specific user can use, orders of priority, and the number of MFPs that can be used simultaneously. In other words, it is possible to prevent the specific user from exclusively using plural image forming apparatuses.

Additional advantages and modifications will readily occur those skilled in the art. Therefore, the invention in its broader aspects is not limited to the specific details and representative embodiments shown and described herein. Accordingly, various modifications may be made without departing from the spirit or scope of the invention as defined by the appended claims and equivalents thereof.

What is claimed is:

1. An image forming apparatus management system comprising:
    an information communication terminal configured to transmit a print request for image data;
    an image forming apparatus configured to receive the print request transmitted from the information communication terminal; and
    a management server comprising:
    a storage unit configured to store management data, the management data registering the information communication terminal in association with at least one permitted image forming apparatus, the permitted image forming apparatus being allowed to print the image data transmitted from the information communication terminal among a plurality of image forming apparatuses included in the system, are registered in association with each other, the management data further associating the information communication terminal, a maximum number of image forming apparatuses in use indicating a maximum number of image forming apparatuses that can execute printing based on the print request by the information communication terminal in parallel among the permitted image forming apparatuses, and orders of priority for setting priority levels among the permitted image forming apparatuses; and
    a control unit configured to determine, on the basis of the management data stored by the storage unit, whether printing of the image data transmitted from the information communication terminal by the image forming apparatus should be permitted.

2. The system of claim 1, wherein the control unit determines whether a number of image forming apparatuses in use exceeds the maximum number of image forming apparatuses in use on the basis of the print request from the information communication terminal to the image forming apparatus and determines, when the number of image forming apparatuses in use does not exceed the maximum number of image forming apparatuses in use, whether the image forming apparatus is included in the permitted image forming apparatuses.

3. The system of claim 2, wherein the control unit determines, when the image forming apparatus is included in the permitted image forming apparatuses, whether the image forming apparatus has a highest priority level in the orders of priority.

4. The system of claim 3, wherein the management data further associates the information communication terminal, a current number of image forming apparatuses in use that is a number of image forming apparatuses in use executing printing based on the print request by the information communication terminal, and a current image forming apparatus in use that is an image forming apparatus executing printing based on the print request by the information communication terminal.

5. The system of claim 4, wherein the control unit subjects the image data to print processing in the image forming apparatus when the image forming apparatus has a highest priority level in the orders of priority.

6. The system of claim 5, wherein the control unit adds 1 to the current number of image forming apparatuses in use associated with the information communication terminal in the management data when the image data is subjected to print processing in the image forming apparatus.

7. The system of claim 4, wherein the control unit determines, when another image forming apparatus having a priority level higher than the priority level of the image forming apparatus in the orders of priority is set, whether the another image forming apparatus is in use.

8. An image forming apparatus management method comprising:
    receiving a print request for image data; and
    determining whether printing of the image data should be permitted on the basis of management data, the management data registering an information communication terminal in association with at least one permitted image forming apparatus, the permitted image forming apparatus being allowed to print the image data transmitted from the information communication terminal among a plurality of image forming apparatuses included in a system, the management data further associating the information communication terminal, a maximum number of image forming apparatuses in use indicating a maximum number of image forming apparatuses that can execute printing based on the print request by the information communication terminal in parallel among the permitted image forming apparatuses, and orders of priority for setting priority levels among the permitted image forming apparatuses.

9. The method of claim 8, wherein it is determined whether a number of image forming apparatuses in use exceeds the maximum number of image forming apparatuses in use on the basis of the print request from the information communication terminal to the image forming apparatus and determined, when the number of image forming apparatuses in use does not exceed the maximum number of image forming apparatuses in use, whether the image forming apparatus is included in the permitted image forming apparatuses.

10. The method of claim 9, wherein it is determined, when the image forming apparatus is included in the permitted image forming apparatuses, whether the image forming apparatus has a highest priority level in the orders of priority.

11. The method of claim 10, wherein the management data further associates the information communication terminal, a current number of image forming apparatuses in use that is a number of image forming apparatuses in use executing printing based on the print request by the information communication terminal, and a current image forming apparatus in use that is an image forming apparatus executing printing based on the print request by the information communication terminal.

12. The method of claim 11, wherein the image data is subjected to print processing in the image forming apparatus when the image forming apparatus has a highest priority level in the orders of priority.

13. The method of claim 12, wherein 1 is added to the current number of image forming apparatuses in use associated with the information communication terminal in the management data when the image data is subjected to print processing in the image forming apparatus.

14. The method of claim 11, wherein it is determined, when another image forming apparatus having a priority level higher than the priority level of the image forming apparatus in the orders of priority is set, whether the another image forming apparatus is in use.

15. A management server comprising:
    a storage unit configured to store management data, the management data registering an information communication terminal in association with at least one permitted image forming the permitted image forming apparatus being allowed to print the image data transmitted from the information communication terminal among a plurality of image forming apparatuses included in a system, the management data further associating the information communication terminal, a maximum number of image forming apparatuses in use indicating a maximum number of image forming apparatuses that can execute printing based on the print request by the information communication terminal in parallel among the permitted image forming apparatuses, and orders of priority for setting priority levels among the permitted image forming apparatuses; and
    a control unit configured to determine, on the basis of the management data stored by the storage unit, whether printing of the image data transmitted from the information communication terminal by an image forming apparatus should be permitted.

16. The server of claim 15, wherein the control unit determines whether a number of image forming apparatuses in use exceeds the maximum number of image forming apparatuses in use on the basis of the print request from the information communication terminal to the image forming apparatus and determines, when the number of image forming apparatuses in use does not exceed the maximum number of image forming apparatuses in use, whether the image forming apparatus is included in the permitted image forming apparatuses.

17. The server of claim 16, wherein the control unit determines, when the image forming apparatus is included in the permitted image forming apparatuses, whether the image forming apparatus has a highest priority level in the orders of priority.

* * * * *